April 1, 1941.  A. E. OZOUF  2,236,605
CARCASS DIPPING APPARATUS
Filed Nov. 5, 1937  6 Sheets-Sheet 1

Inventor
Arthur E. Ozouf
By Fred Gerlach
Atty

Patented Apr. 1, 1941

2,236,605

UNITED STATES PATENT OFFICE 2,236,605

CARCASS DIPPING APPARATUS

Arthur E. Ozouf, Chicago, Ill., assignor to The Allbright-Nell Co., Chicago, Ill., a corporation of Illinois Application November 5, 1937, Serial No. 172,907

12 Claims. (Cl. 17—1)

The present invention relates generally to apparatus for dipping machine-dehaired hog carcasses in a tank of molten resinous material in order to form seal-like coatings which upon stripping or peeling from the carcasses effect removal of the hair and roots remaining after the machine dehairing operation as well as removal of various glandular secretions and other undesirable matter from the skin portions of the carcasses. More particularly the invention relates to that type of dipping apparatus which is adapted for disposition in an interruption or cut-out in an overhead rail for use with gambrel-supporting trolleys in conveying the carcasses from the dehairing machine to either a polishing machine or the carcass-cutting and inspection line, and operates during use or operation thereof to take the trolley-supported carcasses from the preceding section of the rail, that is, the section between it and the dehairing machine or the usual gambrel-applying table at the discharge end of the dehairing machine and then, after dipping of the carcasses into the tank for coating purposes, to transfer or place the dipped carcasses on the section of the rail leading from it to the polishing machine or cutting and inspection line.

One object of the invention is to provide an apparatus of this type which effectively and efficiently fulfills its intended purpose and is adapted primarily for use in carrying out the carcass-treating method or process which forms the subject matter of United States Letters Patent No. 2,100,299, granted November 23, 1937, to Frederick M. Tobin.

Another object of the invention is to provide a dipping apparatus of the type under consideration which is of unitary design and comprises a frame over the tank of molten resinous material and in addition a frame-supported motor-driven endless conveyor which is in the form of a pair of laterally spaced chains and hook-equipped cross-shafts between the chains and embodies a substantially horizontal reach between and slightly above the preceding and following sections of the overhead rail, a downwardly extending reach for lowering the carcasses from the preceding rail section into the tank, and an upwardly extending reach between the lower end of the downwardly extending reach and the opposite end of the horizontal reach for elevating the dipped or coated carcasses from the tank and delivering them to the following rail section.

Another object of the invention is to provide a dipping apparatus of the last mentioned character in which the hooks which are associated with the cross-shafts of the endless conveyor are so controlled that during travel past the discharge end of the so-called preceding rail section, that is, the section between the apparatus and the dehairing machine or gambrel-applying table they are successively brought into hooked relation with the frames of the trolleys on such end of the preceding rail section and during travel past the receiving end of the following section of the overhead rail they first deposit the trolleys on the last mentioned rail section and then are automatically swung out of engagement with the trolley frames so that the trolleys together with their gambrel-supported coated or dipped hog carcasses are free for travel on the following rail section to the point where the resinous coatings are stripped from the carcasses.

A further object of the invention is to provide a carcass-dipping apparatus of the type and character under consideration which includes power-driven mechanism for controlling the hog carcasses on the preceding section of the rail so that they are fed to the discharge end of the latter in properly timed or coordinated relation with movement of the hook-equipped cross-shaft of the conveyor past such end of the preceding rail section, and also includes means for automatically turning the hog carcasses into a position wherein the backs thereof face the downwardly extending reach of the conveyor as soon as they are delivered to the discharge end of the preceding rail section.

A still further object of the invention is to provide a dipping apparatus of the aforementioned type and character which involves a novel and compact arrangement of the various parts thereof and embodies means for holding or controlling the carcasses so that the backs thereof face forwards, that is, in the direction of the discharge end of the apparatus during downward movement into the molten resinous material in the subjacent tank.

Other objects of the invention and the various advantages and characteristics of the present hog carcass-dipping apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 4 is an enlarged fragmentary perspective view of the receiving end of the conveyor, illustrating the manner in which the hooks which are associated with and carried by the cross-shafts on the endless conveyor are controlled so that during travel past the discharge end of the preceding rail section they are brought into hooked relation with the frames of the trolleys;

Figure 3:
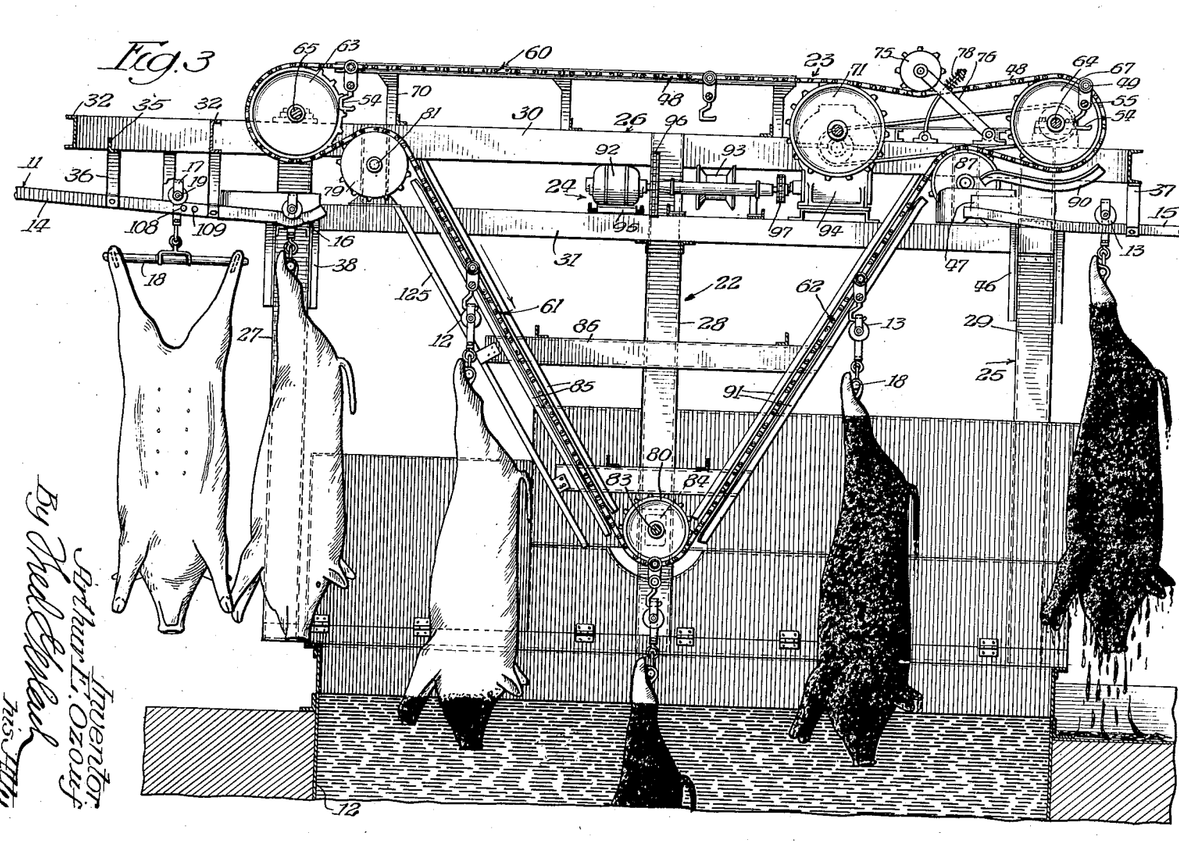
Figure 3 is a vertical longitudinal sectional view of the apparatus, showing in detail the manner in which the endless conveyor serves to convey the carcasses from the discharge end of the preceding rail section downwards through the tank for coating purposes and then upwards to the receiving end of the following section of the overhead rail.

The apparatus which is shown in the drawings constitutes the preferred embodiment of the invention. It is designed expressly for use in a combined slaughtering and packing house having an overhead rail 11 for conveying hog carcasses from a dehairing machine (not shown) to a polishing machine (also not shown) in front of the usual cutting and inspection line, and serves during operation thereof to dip the carcasses, one at a time, into a tank 12 containing molten resinous material in order to apply substantially complete seal-like coatings which when stripped or peeled from the carcasses remove the hair and roots remaining after the machine dehairing operation and also effect removal of various glandular secretions and other undesirable matter from the skin portions of the carcasses. Principally the apparatus is adapted for use in carrying out the method or process which forms the subject matter of the aforementioned Tobin Patent No. 2,100,299, to which reference may be had for a more complete or detailed disclosure. The overhead rail 11 is adapted to support the hog carcasses in a depending inverted position by way of trolleys 13. It has a cut-out or interruption therein for the dipping apparatus, as shown in Figure 3, and comprises a preceding rail section 14 and a following rail section 15. The rail section 14 leads from the aforementioned dehairing machine for the hog carcasses or the usual gambrel-applying table at the discharge end of the dehairing machine to the receiving end of the apparatus and has a downwardly inclined discharge end whereby the trolley-supported carcasses tend to gravitate toward the receiving end of the apparatus. The extremity of the discharge end of the rail section 14 embodies a depression 16 in the top face thereof for receiving the trolleys and holding them in place until they and the hog carcasses which are suspended therefrom are picked up by the apparatus, as hereinafter described. The so-called following rail section 15 leads from the discharge end of the apparatus to the aforementioned polishing machine or cutting and inspection line and has a downwardly inclined receiving end whereby the trolleys 13, when deposited thereon, are caused in response to the action of gravity to move forwardly along the rail section 15. The trolleys 13 have annular grooves in the peripheries thereof for receiving the upper faces or margins of the sections of th overhead rail and through the medium of frames 17 support gambrels 18 in a dependent position. The frames 17 are vertically elongated and have inverted U-shaped upper ends which overlie the trolleys and are connected thereto by way of pins 19. The lower ends of the trolley frames are adapted to underlie the rail sections, as shown in the drawings, and are connected to the central portions of the gambrels 18 by eye-bolts 20 and brackets 21. The gambrels 18 are adapted to be applied to the hocks of the hog carcass after the latter have been subjected to the action of the dehairing machine and extend substantially horizontally when supported or suspended from the overhead rail 11 by the trolleys 13. The brackets 21 are applied to the central portions of the gambrels and the eye bolts 20 are swivelly connected to the lower ends of the trolley frames in order that the carcasses are normally free to turn.

After application of the gambrels to the hocks of the carcasses the trolleys 13 are placed on the preceding rail section 14. Thereafter the carcasses while in a dependent position are moved along such rail section to the receiving end of the dipping apparatus. From the discharge end of the rail section 14 the carcasses, as hereinafter described, are picked up and then after being dipped in the material in the tank 12 are elevated and then transferred to the receiving end of the following rail section 15. The tank is disposed, as shown in Figure 3, beneath the interruption or cut-out in the overhead rail 11 and is suitably mounted in the floor of the room in which the dipping operation is carried out. It is elongated in the direction of the rail and is adapted to be heated by way of steam coils (not shown) in order to maintain the resinous material therein at the desired temperature.

The dipping apparatus is disposed directly above the tank 12 and comprises as the main or essential parts thereof an elongated frame 22, an endless conveyor 23, and mechanism 24 for driving the conveyor.

Figure 5:
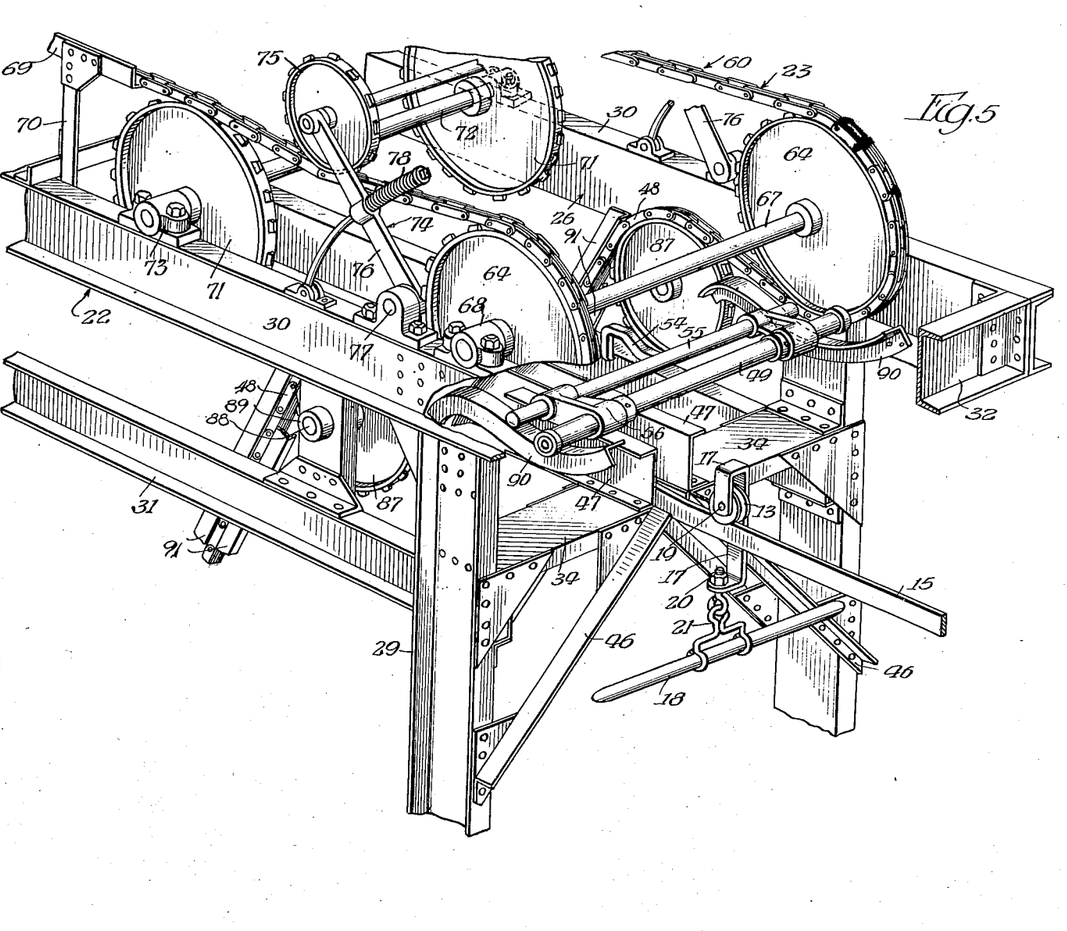
Figure 5 is an enlarged fragmentary perspective view of the discharge end of the conveyor, showing in detail the manner in which the hooks are controlled so that after the dipping operation and travel to the end of the upwardly extending reach of the conveyor they operate first to deposit the trolleys on the receiving end of the following section of the overhead rail and then are automatically swung out of engagement with the trolley frames so that the trolleys together with the coated hog carcasses are free for travel on the following rail section to the point where the coatings are stripped from the carcasses.
Figure 6:
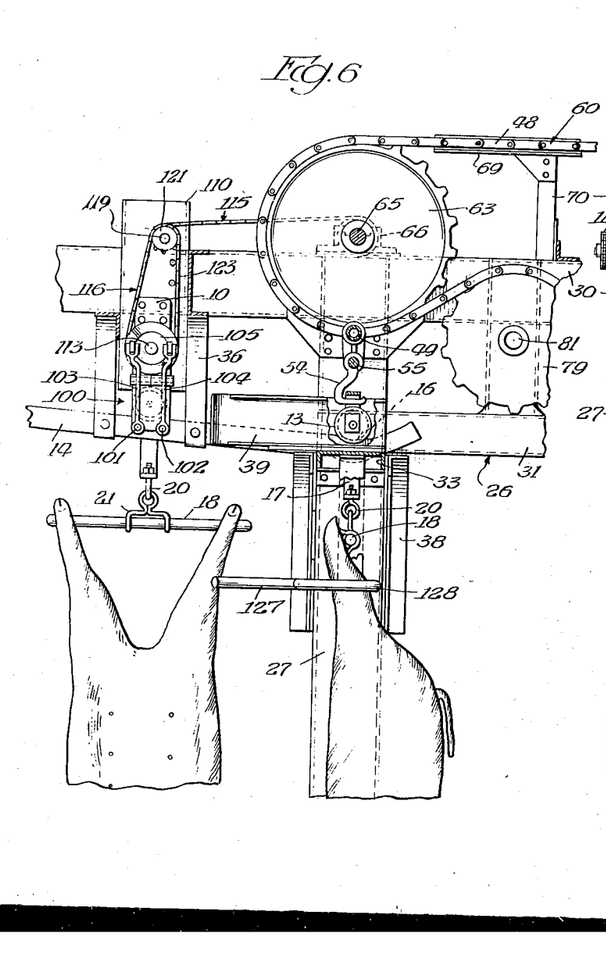
Figure 6 is an enlarged fragmentary vertical longitudinal sectional view of the receiving end of the apparatus illustrating in detail the construction and design of the power-driven mechanism for controlling the hog carcasses on the preceding section of the rail so that they are fed to the discharge end of the latter in properly timed or coordinated relation with movement of the hook-equipped cross-shafts of the conveyor past such end of the preceding rail section.

The frame 22 is interposed between the discharge end of the preceding rail section 14 and the receiving end of the following rail section 15 and embodies a pair of sides 25 and a top 26. The sides of the frame are disposed in laterally spaced relation and extend upwards from the sides of the tank 12. They serve as a supporting medium for the top 26 of the frame and consist of front uprights 27, intermediate uprights 28, and rear uprights 29. The front uprights are in the form of channel beams and serve to support the front end of the top 26 of the frame. The rear uprights are also in the form of channel beams and, as shown in Figures 3 and 5, support the rear end of the top. The intermediate uprights are spaced equidistantly between the front and rear uprights and underlie and support the central portion of the top 26. Said top consists of a pair of parallel laterally spaced horizontally extending upper longitudinal beams 30, a pair of parallel laterally spaced horizontally extending lower longitudinal beams 31, a longitudinal series of crossbeams 32 between the upper beams 30 and a pair of cross beams 33 and 34 between the lower beams 31. The upper beams 30 are of channel design and are secured to the extreme upper ends of the uprights constituting the frame sides 25. They are disposed slightly above the sections 14 and 15 of the overhead rail 11 and are of such length that the front ends thereof overhang the discharge end of the preceding rail section 14 and their rear ends overhang the receiving end of the following section 15. The crossbeams 32 are suitably secured to the upper beams 30 and serve to hold the latter in laterally spaced and rigid relation. The front ends of the upper beams 30 are additionally cross-connected by angle iron bars 35 and these, as shown in Figures 3 and 6, carry depending hangers 36 for the discharge end of the preceding rail section 14. A hanger 37 serves to support the receiving end of the following rail section 15 and this hanger is suspended from the crossbeam 32 which is located between the rear extremities or ends of the beams 30. The lower beams 31 are disposed beneath and parallel to the upper beams 30. They are substantially horizontally aligned with the rail sections 14 and 15 and are suitably connected to the upper ends of the uprights 27, 28 and 29. The crossbeam 33 extends between and is secured to the upper ends of the front uprights 27 of the frame sides 25 and is disposed directly beneath the front ends of the lower beams 31. It underlies the discharge end of the preceding rail section 14 and is severed or cut away at the central portion thereof in order to permit the trolley frames 17 to pass across it during movement of their respective trolleys into contact with the depression 16. The inner or severed ends of the two sections of the crossbeam 33 are supported by way of diagonal angle bar braces 38 and carry in an upstanding position a pair of laterally spaced guides 39 and 40. The latter serve to guide the trolleys 13 onto the depression 16 and prevent them during movement toward the extremity of the discharge end of the preceding rail section 14 from assuming an angular position with respect to said rail section. The guide 40 embodies at the rear end theerof a pivoted brake plate 41. This plate is adapted to engage the trolley frames as the trolleys move into contact with the depression 16 and by way of friction prevents the trolleys from rolling over the extremity of the discharge end of said rail section 14. A spring 42 on a stem 43 serves to urge the brake plate 41 into frictional engagement with the trolley frames. This spring is of the compression variety and abuts against a block 44 (see Figure 8) on the crossbeam 33. The stem 43 is pivotally connected at one end thereof to the distal end of the brake-plate 41 and the other end of the stem extends through the block 44 and embodies a pair of nuts 45 whereby inward swinging of the brake-plate is limited. The crossbeam 34, like the crossbeam 33 is formed of channel iron. It extends between and is connected to the upper ends of the rear uprights 29 of the frame sides 25 and is disposed adjacent to the rear ends of the lower beams 31. The central portion of the crossbeam 34 is cut away or severed so as to accommodate the receiving end of the rail section 15 and also permit the trolley frames 17 to pass thereacross. The inner or severed ends of the two sections of the crossbeams are supported by diagonal angle bar braces 46 and carry a pair of laterally spaced channel type guide members 47 which project toward the front or receiving end of the frame 22 and serve to guide and hold against lateral displacement the trolleys 13 after elevation thereof into an overlying position with respect to the receiving end of the following rail section 15 at the conclusion of the dipping operation.

Figure 9:
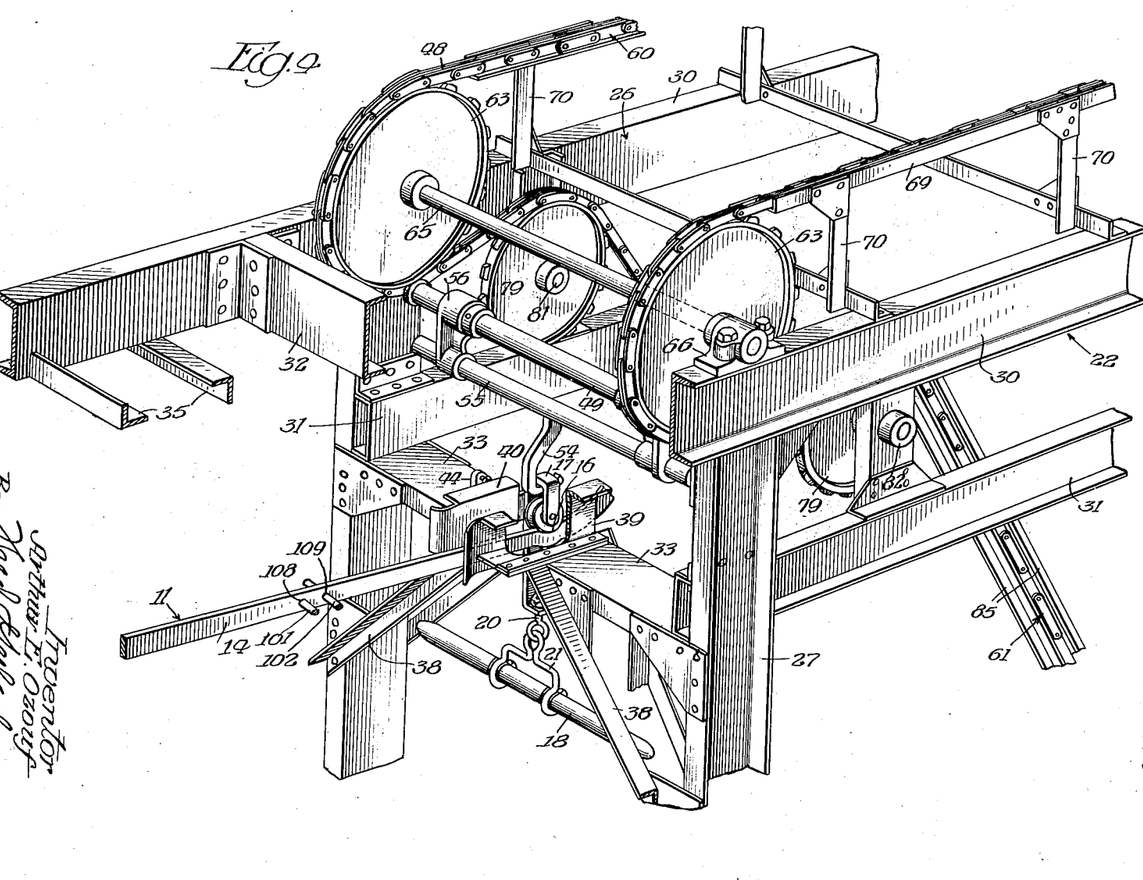
Figure 9 is an enlarged vertical longitudinal sectional view of the discharge end of the apparatus showing in detail the design of such end and the arrangement and construction of the control means whereby the hooks after deposit of the trolleys on the receiving end of the following section of the overhead rail are swung out of engagement with the trolley frames.
Figure 10:
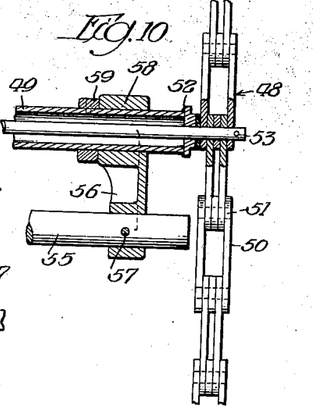
Figure 10 is a fragmentary sectional view illustrating in detail the structural design of the motor driven endless conveyor.

The endless conveyor 23 is disposed between the sides 25 of the frame 22 and consists of a pair of laterally spaced chains 48 and a series of cross-shafts 49 between the chains. The chains, as shown in Figure 10, comprise serially arranged pairs of links 50 which are pivotally connected together by pivot pins 51. The cross-shafts 49 extend between the two chains 48 and serve to cross-connect them for conjoint drive. They are in the form of pipes and have end caps 52 and in addition, rods 53 extending longitudinally therethrough. The ends of the rods 53 are pivotally connected to certain of the pairs of links and serve as the medium of attachment between the cross-shafts and the chains. The cross-shafts 49 have associated therewith hooks 54 for engagement with the upper ends of the trolley frames and these hooks are mounted on cross-rods 55 which are spaced a slight distance from and extend parallel to the shafts 49 and are connected to the latter by way of pairs of arms 56. As shown in the drawings, the hooks 54 are fixedly mounted on the central portions of the cross-rods 55 and face in the direction of the discharge end of the apparatus. The arms 56 are fixedly secured by pins 57 to the ends of the cross-rods 55 and have ring shaped members 58 which extend loosely around the outer ends of the cross-shaft 49 and are held against inward longitudinal displacement by way of collars 59 on said cross-shafts. By reason of the pivotal connections between the ends of the cross-shafts and the chains and because the members 58 fit loosely around the ends of said cross-shafts, the hooks 54 tend normally in response to the action of gravity to maintain a depending attitude with respect to the cross-shafts. The chain and cross-shaft formed conveyor 23 is arranged or designed so that it embodies a substantially horizontal reach 60, a downwardly extending reach 61 and an upwardly extending reach 62, and is adapted to be driven by the mechanism 24 so that the chains and cross-shafts thereof move in the direction of the preceding rail section 15, that is, towards the receiving end of the frame during travel in the upper reach, then downwards towards the tank 12 in connection with travel in the downwardly extending reach 61, and finally upwards away from the tank and in the direction of the receiving end of the following rail in connection with travel in the upwardly extending reach 62. As hereinafter described, the hooks 54 on the central portions of the cross-shaft supported cross-rods 55 are adapted during travel of the cross-shafts in the reach 61, first, to engage the trolley frames 17 at the discharge end of the rail section 14 and lift the trolleys and the carcasses associated therewith from said end of the section 14 and then to lower the carcasses into the molten resinous material in the tank 12, as shown in Figure 3. During travel of the cross-shafts in the reach 62 of the conveyor, the hooks through the medium of the trolley frames and gambrels elevate the dipped carcasses to a point directly in front of the receiving end of the following rail section 15. At such point the hooks are adapted to place the trolleys on the rail section 15 and then are automatically controlled so that they are swung out of engagement with the trolley frames and the trolleys are thus free to travel on the rail section 15. The horizontal reach 60 of the conveyor is disposed in a slightly elevated position with respect to the upper longitudinal beams 30 of the top 26 of the frame and is supported at its front end by a pair of sprockets 63 and at its rear end by a pair of sprockets 64. The sprockets 63 are disposed directly above the discharge end of the preceding rail section 14 and have the contiguous portions of the conveyor chains 48 wrapped therearound. They are aligned with the sprockets 64 and are fixedly secured to a shaft 65 which is journaled in bearings 66 on the front ends of the upper longitudinal beams 30. The sprockets 64 are located above the receiving end of the following rail section 15, as shown in Figures 3 and 5. They have the contiguous portions of the conveyor chains wrapped therearound and are fixedly secured to a horizontally extending shaft 67 which is journaled in bearings 68 on the rear ends of the beams 30. The front parts of the portions of the chains 48 in the upper reach of the conveyor are slidably mounted on and supported by a pair of angle bar type tracks 69. These tracks are arranged in laterally spaced relation and are supported from the upper longitudinal beams 30 of the frame top 26 by way of standards 70. The rear parts of the portions of the chains in the upper reach of the conveyor are supported by way of a pair of idler sprockets 71. The latter are disposed slightly forwards of, and in substantial alignment with, the sprockets 64 and are mounted on a shaft 72 which extends transversely across the two beams 30 and is journaled in a pair of bearings 73 on said beams. A belt tightener 74 is applied to the chains 48 at a point between the pair of sprockets 64 and the pair of sprockets 71. This tightener comprises a pair of sprocket wheels 75 which rest upon the aforementioned portions of the chains and are mounted on the distal ends of a pair of pivot arms 76. The latter are connected to pivot studs 77 on brackets at the rear ends of the beams 30 and have compression springs 78 applied thereto so that they are urged downwards and cause the wheels 75 to take up any slack in the two chains. The downwardly extending reach 61 of the conveyor extends in diagonal manner between a pair of chain-engaging idler sprockets 79 and a pair of laterally spaced idler sprockets 80. The sprockets 79 are located slightly rearwards of, and beneath, the sprockets 63 and are mounted on a pair of stub shafts 81 in bearings 82 on the front ends of the lower longitudinal beams 31 of the frame top 26. As shown in Figures 3 and 4, the conveyor chains 48 extend over the top portions of the idler sprockets 79 and then pass downwardly to the sprockets 80. The sprockets 79, as the result of their location or position with respect to the sprockets 63, cause the chains after passing around said sprockets 63 to travel upwards and rearwards for a slight distance in substantially parallel relation with the extremity of the discharge end of the preceding rail section 14. Because of this and due to the spacing and size of the sprockets 63, the hooks 54 after passing around the shaft 65 of the sprockets 63, move across the depression 16 in said discharge end of the rail section 14 and engage the trolley frames over such depression and then pass or move upwards and effect raising of the trolleys. After passing the sprockets 79, the hooks with the engaged trolley frames and their attendant gambrel-supported carcasses, move forwardly and downwardly toward the tank 12. The idler sprockets 80 have the conveyor chains wrapped around the bottom portions thereof and are mounted on a cross shaft 83 between the lower ends of the intermediate uprights 28 of the frame sides 25. They are aligned with or spaced correspondingly to the sprockets 79 and are so positioned above the tank that when the hooks 54 pass therearound the carcasses depending from the hooks become immersed in the molten resinous material. Bearings 84 on the uprights 28 serve to support the cross-shaft 83 and the sprockets 80. The portions of the conveyor chains in the reach 61 are guided or held against sagging movement by way of diagonally extending angle iron tracks 85. These tracks, as shown in Figures 3 and 4, are carried by horizontally extending beams 86 on the central portions of the intermediate uprights 28. The upwardly extending reach 62 of the conveyor extends between the idler sprockets 80 and a pair of chain engaging idler sprockets 87 between and slightly beneath the sprockets 64 and 71. Said idler sprockets 87 are arranged so that the chains pass thereover and are mounted on a pair of laterally spaced stub shafts 88 which are journaled in bearings 89 on the rear ends of the lower longitudinal beams 31 of the frame top 26. They are aligned with and spaced correspondingly to the idler sprockets 80 and are so arranged with respect to the sprockets 64 that the hooks 54 during travel past them pass with their respective trolleys between the pair of guides 47 and then slightly downwards so as to deposit said trolleys on the receiving end of the following rail section 15. In order to disengage the hooks 54 from the trolley frames after deposit of the trolleys on such end of the rail section 15, two laterally spaced cam elements 90 are provided. These elements are suitably carried or fixedly supported between the rear ends of the upper longitudinal beams 30 and are adapted after deposit of the trolleys by the hooks on the rail section 15 to engage the ends of the cross-rods 55 and to swing such rods rearwards with respect to their respective cross-shafts and cause the hooks to swing rearwards out of engagement with the trolley frames 17 (see Figure 9). After travel past the receiving end of the following section of the overhead rail the hooks are adapted to be released by the cam elements 90 so that they, together with the rods 55, are free to assume their normal position wherein they extend in a dependent manner from the cross-shafts 49. The elements 90 constitute simple means for disengaging the hooks 54 from the trolley frames 17 after deposit of the trolleys on the receiving end of the rail section 15. The portions of the conveyor chains 48 in the upwardly extending reach 62 of the conveyor, that is, between the idler sprockets 80 and 87, are guided and held against sagging by way of diagonal angle bar tracks 91. These tracks extend upwardly and rearwardly and are fixedly secured to and carried by the horizontally extending beams 86. When driven by the mechanism 24 the conveyor 23 operates through the medium of the hooks 54 first to remove the hog carcasses from the discharge end of the rail section 14, then to lower the carcasses into the tank 12 so that they become immersed in, and are coated by, the molten resinous material, and finally to elevate the carcasses from the tank and cause them to be suspended on the receiving end of the following rail section 15.

Figure 1:
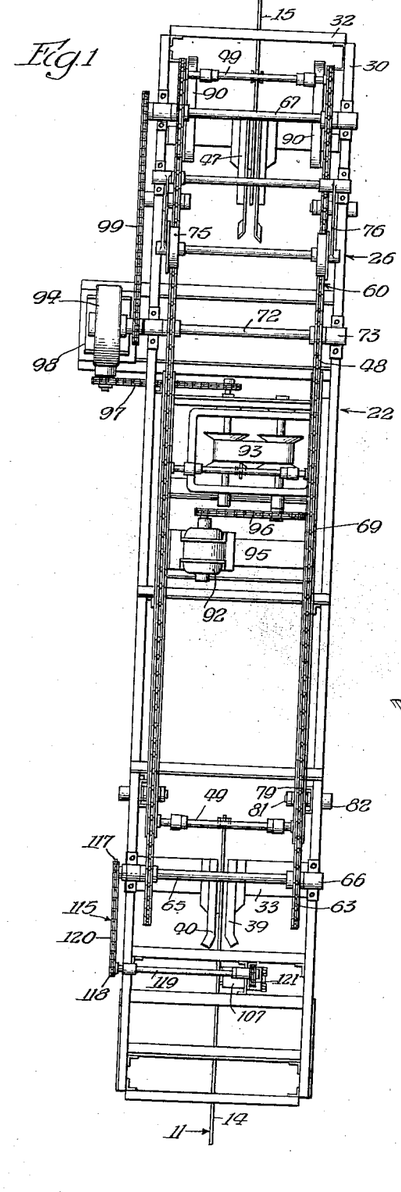
Figure 1 is a plan view of a dipping apparatus embodying the invention, illustrating the type and arrangement of the mechanism for driving the endless conveyor.
Figure 2:
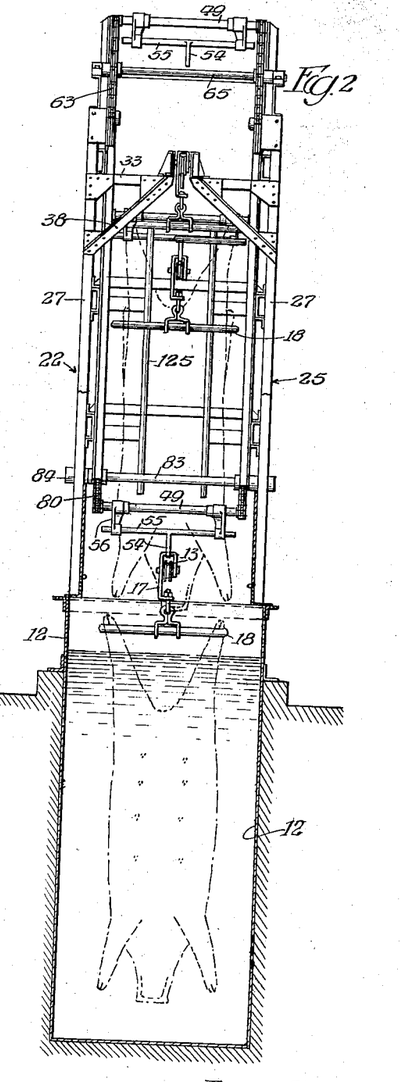
Figure 2 is a vertical transverse sectional view through the receiving end of the apparatus, that is, the end which is disposed adjacent to the discharge end of the preceding section of the overhead rail and includes the downwardly extening conveyor reach for lowering the carcasses into the tank.

The conveyor driving mechanism 24 is mounted on the top 26 of the frame of the apparatus and comprises an electric motor 92, a belt type variable speed reducing unit 93, and a worm gear type speed reducing unit 94. The motor 92 is mounted on a platform 95 between the central portions of the lower longitudinal beams 31 of the frame top 26 and operates to drive the drive shaft of the variable speed reducing unit 93 through the medium of a sprocket and chain connection 96. The latter, as shown in Figure 1, comprises a small sprocket on the armature shaft of the electric motor, a large sprocket on the drive shaft of the variable speed reducing unit 93, and a drive chain which extends around and drivably connects the two sprockets. The variable speed reducing unit 93 is suitably mounted between the intermediate or central portions of the beams 31 and its driven shaft is connected by way of a sprocket and chain connection 97 to drive the drive shaft of the speed reducing unit 94. Said connection 97 comprises a small sprocket on the driven shaft of the unit 93, a large sprocket on the drive shaft of the unit 94, and an endless chain around the two last mentioned sprockets. The belt of the unit 93 extends between pairs of driving cones on the drive and driven shafts and is adapted in response to adjustment of the cones to change the speed of drive of the conveyor. The worm gear type speed reducing unit 94 is mounted on a platform 98 at one side of the frame 22 of the apparatus and is connected to drive the shaft 67 for the sprockets 64 by way of a sprocket and chain connection 99. The latter, as shown in Figure 1, comprises a sprocket on the driven shaft of the unit 94, a sprocket on one end of said shaft 67, and an endless chain between the two sprockets. When it is desired to operate the apparatus it is only necessary to start the electric motor 92. Upon starting of this motor the mechanism 24 is set in motion with the result that the endless conveyor 23 is driven, as hereinbefore described, and the hog carcasses are moved one at a time from the rail section 14 and then, after dipping, are placed on the rail section 15 as hereinbefore described. In the event that it is desired to increase or decrease the speed of operation of the apparatus, that is, the number of hog carcasses dipped per hour the belt type speed reducing unit 93 is adjusted as desired.

Figure 7:
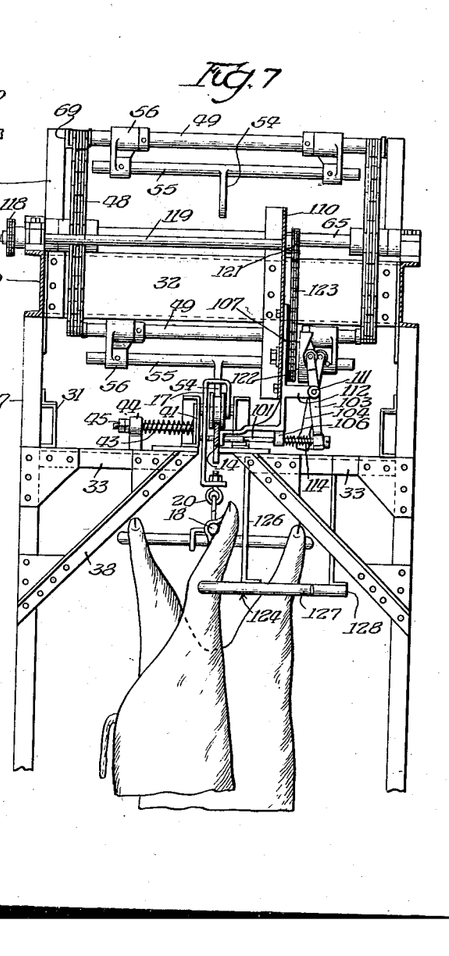
Figures 7 and 8 are respectively fragmentary vertical transverse and horizontal sectional views of the receiving end of the apparatus, exhibiting in detail the design and arrangement of the means for automatically turning the hog carcasses into a position wherein the backs thereof face the downwardly extending reach of the conveyor as soon as they are delivered to the discharge end of the preceding rail section.

In addition to the frame 22, the endless conveyor 23 and the conveyor driving mechanism 24, the apparatus comprises mechanism 100 for controlling the hog carcasses on the rail section 14 so that they are fed or delivered to the discharge end of said section 14 in properly timed or coordinated relation with the movement of the hooks 54 past the depression 16 in said end of the rail section 14. This mechanism is driven from the electric motor 92 through the medium of the endless conveyor 23 and hence it operates in synchronism with the latter. It is essentially automatic in character and comprises a pair of horizontally extending, laterally spaced, plunger type stop rods 101 and 102, a pair of upstanding or substantially vertical levers 103 and 104 for actuating the rods 101 and 103 respectively, and a cam wheel 105 for swinging the levers, as hereinafter described. The rods 101 and 102 extend at right angles to the discharge end of the rail section 14 and are spaced apart a distance corresponding to the width of the central portion of the trolley frames 17. They are carried for horizontal sliding movement to and from the rail section 14 by way of depending lugs 106 on a bracket 107 and are aligned respectively with a pair of holes 108 and 109 in said rail section 14. The bracket 107 is connected to and depends from a vertically extending channel iron beam 110 which fits against and is secured to one of the cross-beams 32 between the upper longitudinal beams 30 of the frame top 26. When the rods are alternately slid inwards, as hereinafter described in response to swinging movement of the levers, the inner ends pass through the aforementioned holes 108 and 109 and project beyond the preceding rail section 14 in such manner as to form stops or abutments for the central or intermediate portions of the trolley frames 17. When the rod 102 is in its operative stop-forming position and the rod 101 is in its retracted position the carcass-supporting trolley next in line on the rail section 14 is free to roll downwards until the central portion of its frame 17 strikes against the projecting or stop-forming inner end of the rod 102. When the rod 102 is retracted the rod 101 is adapted to be shifted into its operative or stop forming position and the carcass-supporting trolley under control of the mechanism 100 is released so that it rolls to the depression 16 wherein it is positioned for lift or removal by the next hook 54 next in line on the conveyor. When the rod 101 is in its operative position, the discharge end of the rail section 14 is blocked against passage of the next following carcass-supporting trolley. Upon retraction of the rod 101 the rod 102 is adapted to be shifted into its operative or stop-forming position. During such operation of the two rods the said next following carcass-supporting trolley passes the rod 101 and is arrested by the central portion of its frame-engaging the projecting or inner end of the rod 102. As the result of alternate reciprocation or sliding movement of the two rods the carcass-supporting trolleys are controlled so that they pass, one at a time, to the extremity of the discharge end of the section 14. The levers for actuating the rods are centrally fulcrumed or pivoted by way of a pin 111 on a lug 112 which is formed integrally with and projects outwardly from the bracket 107. The lower ends of the two levers have forks which, as shown in Figures 6 and 7, straddle the outer ends of the plunger type rods and fit between nuts or shoulders on such ends of the rods. The upper ends of the levers have rollers which bear against diametrically opposite portions of the cam face of the wheel 105. Said wheel is fixed to a horizontal shaft 113 on the bracket 107 and is so shaped as far as the cam face thereof is concerned that during rotation it operates alternately to swing outwards the upper ends of the levers 103 and 104. When the upper end of the lever 104 is swung outwards by the cam wheel the rod 103 due to inward swing of the lower end of said lever 104 slides inwards into its operative position. During outward swing of the upper end of the lever 103 the rod 101 is shifted inwards as the result of inward swing of the lower lever 103. Compression springs 114 are mounted on the outer ends of the rods 101 and 102 between the forks at the lower ends of the levers and one of the lugs 106 of the bracket 107 and operate to urge the lower ends of the lever outwards and thus hold the rollers in engagement with the cam wheel and also retract the rods. The shaft 113 is journaled in a suitable bearing on the bracket 107 and is driven for cam wheel rotating purposes from the conveyor 23 by way of a sprocket and chain connection 115 and a sprocket and chain connection 116. The connection 115 comprises a sprocket 117 on one end of the shaft 65, a sprocket 118 on one end of a horizontally extending shaft 119, and an endless chain 120 extending around the two sprockets. The shaft 119 is journaled in suitable bearings and overlies the front ends of the upper longitudinal beams 30 of the top of the frame. The connection 116 comprises a sprocket 121 on the other end of the shaft 119, a sprocket 122 on the shaft 113, and an endless chain 123 extending around the two last mentioned sprockets. The sprocket and chain connections 115 and 116 are adapted or designed so to drive the cam wheel 105 that the mechanism 100 operates in a synchronous manner as far as the conveyor 23 is concerned and so controls the carcass supporting trolleys on the preceding rail section 14 that there is one trolley on the depression 16 at the extremity of the discharge end of said rail section 14 every time one of the hooks 54 traverses or passes such extremity. Due to the fact that the mechanism 100 is driven from the conveyor it always operates to effect the proper delivery of the carcass supporting trolleys regardless of the rate of speed at which the conveyor is driven.

Figure 8:
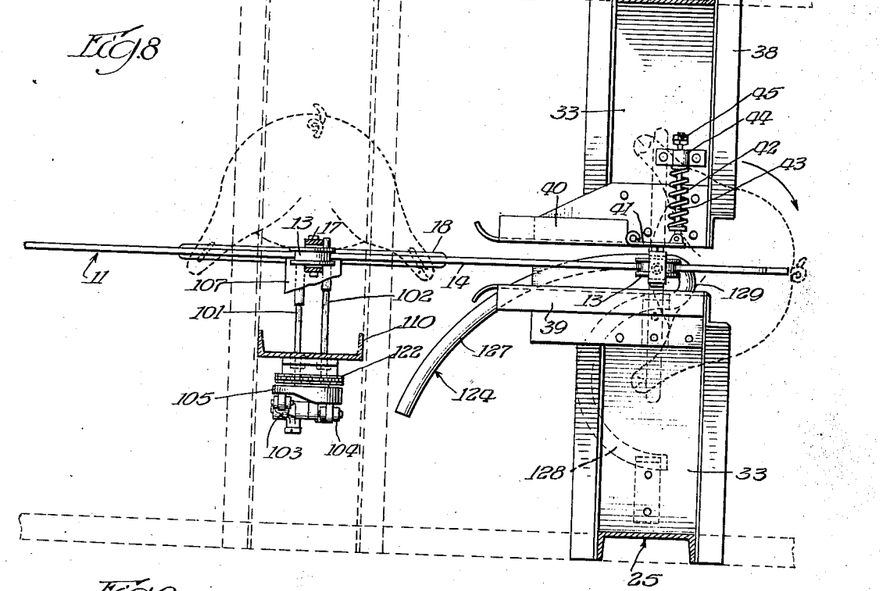

As additional parts or elements the dipping apparatus comprises means for automatically turning the carcasses into a position wherein the backs thereof face the downwardly extending reach 61 of the conveyor as soon as they are delivered to the discharge end of the preceding rail section 14 and means for holding or controlling the carcasses so that the backs thereof face forwards during downward and forward movement with respect to the molten resinous material in the tank 12. The first mentioned means consists of a deflector type rod 124, and the second mentioned means comprises a pair of laterally spaced bars 125. The rod 124 is located directly beneath and to one side of the extremity of the discharge end of the preceding rail section 14. It is supported by way of hangers 126 from one of the sections of the centrally severed crossbeam 33 of the frame and is bent or shaped so that it embodies a curved end 127 and a semicircular end 128 with a sharp semicircular reverse bend 129 therebetween. The bend 129 is located directly beneath the depression 16 in the discharge end of the rail section 14 and the curved end 127 projects forwardly therefrom and to one side of the rail section 14, as shown in Figure 8. The semicircular end 128 faces or opens in the direction of the reach 61 of the conveyor and is disposed behind the curved end 127. The carcasses in passing from the mechanism 100 to the extremity of the discharge end of the preceding rail section 14, travel, as a general rule, with one hock leading and the other hock trailing, as shown in Figures 6, 7 and 8. The curved end 127 of the rod 124 is so arranged and designed that as a carcass passes by it the leading hock strikes against it and is urged to one side until it passes the bend 129. On passage of the leading hock past the bend 129 the end 127 is adapted to be engaged by the trailing hock of the carcass and as the result of its curvature swings the latter outwards and causes the leading hock to enter the semicircular end 128, as shown in Figure 8. The bars 125 are disposed in front of, and extend parallel to, the reach 61 of the conveyor and are suitably secured in place by brackets on the front ends of the beams 86. They are spaced apart a distance less than the length of the gambrels 18 and are adapted to have the latter pass downwardly thereagainst during downward travel in the direction of the tank 12. As the result of the arrangement and spacing of the bars 125 the gambrels are so controlled that they are maintained in a transverse position with respect to the frame of the apparatus and hence the hogs depending therefrom cannot turn sidewise and move forwardly and downwards into the material in the tank 12 with their backs facing forwards, that is, towards the discharge end of the apparatus. By preventing the hogs from turning during lowering thereof into the resinous material in the tank and by controlling the carcasses so that the backs face towards the discharge end of the apparatus efficient coating of the carcasses is obtained.

Assuming that the motor 92 is in operation and that the machine-dehaired carcasses are being fed along the preceding section 14 of the overhead rail 11 to the downwardly inclined discharge end of the depression 16 the operation of the apparatus is as follows: As the carcasses approach said discharge end of the rail section 14 they are subjected to the action of the mechanism 100 which so controls them that they are delivered one at a time to the extremity of said discharge end of the section 14 in timed relation with passage of the hooks 54 thereby. As each carcass is released by the mechanism 100 it travels toward the depression 16 until it is arrested by the trolley therefor rolling into said depression and being subjected to the action of the brake plate 41. During the aforesaid travel each carcass is turned by the bar 124 so that the back thereof faces the downwardly extending reach 61 of the conveyor. Upon arrival of each carcass beneath the depression 16 it is picked up by one of the hooks 54 and then moved downwards and forwardly into the tank 12 where it receives a coating of the molten resinous material. After coating each carcass is elevated by the conveyor and then, as hereinbefore described, deposited upon the receiving end of the following rail section 15. After deposit on the rail section 15 the carcasses are moved forwards to a point where the resinous coatings are stripped therefrom while in a plastic state in order to effect removal of the hair and roots remaining after the machine-dehairing operation as well as glandular and other undesirable matter from the skin portions of the carcasses.

The herein described apparatus is essentially automatic in that it operates without human participation or agency to remove the carcasses one at a time from the discharge end of the preceding rail section 14 and then after dipping them in the tank 12 for coating purposes to place them upon the receiving end of the rail section 15 for travel past the coating removing point, and then to the polisher and cutting and inspection line. Due to the construction and arrangement of the parts the apparatus as a whole is durable and well suited for its intended purpose.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, a power driven endless conveyor supported by the apparatus frame and embodying a series of hooks shaped to engage the trolley frames and adapted during drive of the conveyor to be brought successively into hooked relation with the frames of the trolleys on the adjacent end of the preceding rail section, then to remove said trolleys with their respective carcasses from said adjacent end of the preceding rail section, then to lower said trolleys towards the tank in order to effect dipping of the carcasses in the material, then to elevate the trolleys and coated carcasses from the tank, and finally to deposit the trolleys on the adjacent end of the following rail section for travel of said coated carcasses along the latter rail section, and means for disengaging the hooks from the trolley frames after deposit of the trolley on said adjacent end of the following rail section.

2. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, a power driven endless conveyor supported by the apparatus frame and embodying a series of pivotally suspended hooks shaped to engage the trolley frames and adapted during drive of the conveyor to be brought successively into hooked relation with the frames of the trolleys on the adjacent end of the preceding rail section, then to remove said trolleys with their respective carcasses from said adjacent end of the preceding rail section, then to lower said trolleys towards the tank in order to effect dipping of the carcasses in the material, then to elevate the trolleys and coated carcasses from the tank, and finally to deposit the trolleys on the adjacent end of the following rail section for travel of said coated carcasses along the latter rail section, and means for swinging the hooks out of engagement with the trolley frames after deposit of the trolleys on said adjacent end of the following rail section.

3. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, and a power driven endless conveyor supported on the frame so that it embodies a substantially horizontal reach extending between and slightly above the opposed ends of the two rail sections, a downwardly extending reach leading toward the tank and an upwardly extending return reach leading to the adjacent end of the following rail section, and including a series of hooks adapted in connection with drive of the conveyor to be brought successively into hooked relation with the frames of the trolleys on the adjacent end of the preceding rail section directly after travel in the horizontal reach and then immediately thereafter to remove said trolleys with their respective carcasses from said adjacent end of the preceding rail section, then during travel in said downwardly extending reach to lower said trolleys towards the tank in order to effect dipping of the carcasses in the material, and then during travel in the upper reach of the conveyor to elevate the trolleys and coated carcasses from the tank and to deposit the trolleys on the adjacent end of the following rail section for travel of said coated carcasses along said latter rail section.

4. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, a power driven endless conveyor supported on the frame so that it embodies a substantially horizontal reach extending between and slightly above the opposed ends of the two rail sections, a downwardly extending reach leading toward the tank and an upwardly extending return reach leading to the adjacent end of the following rail section, and consisting of a pair of laterally spaced chains and cross rods extending between the chains and having hooks thereon adapted in connection with drive of the conveyor to be brought successively into hooked relation with the frames of the trolleys on the adjacent end of the preceding rail section directly after travel in the horizontal reach and then immediately thereafter to remove said trolleys with their respective carcasses from said adjacent end of the preceding rail section, then during travel in said downwardly extending reach to lower said trolleys towards the tank in order to effect dipping of the carcasses in the material, and then during travel in the upper reach of the conveyor to elevate the trolleys and coated carcasses from the tank and to deposit the trolleys on the adjacent end of the following rail section for travel of said coated carcasses along said latter rail section.

5. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, a power driven endless conveyor supported on the frame so that it embodies a substantially horizontal reach extending between and slightly above the opposed ends of the two rail sections, a downwardly extending reach leading toward the tank and an upwardly extending return reach leading to the adjacent end of the following rail section, and consisting of a pair of laterally spaced chains and a series of cross-shafts extending between the chains and having hooks pivotally suspended therefrom and adapted in connection with drive of the conveyor to be brought successively into hooked relation with the frames of the trolleys on the adjacent end of the preceding rail section directly after travel in the horizontal reach and then immediately thereafter to remove said trolleys with their respective carcasses from said adjacent end of the preceding rail section, then during travel in said downwardly extending reach to lower said trolleys towards the tank in order to effect dipping of the carcasses in the material, and then during travel in the upper reach of the conveyor to elevate the trolleys and coated carcasses from the tank and to deposit the trolleys on the adjacent end of the following rail section for travel of said coated carcasses along said latter rail section, and means carried by the apparatus frame and arranged to swing the hooks out of engagement with the trolley frames after deposit of the trolleys on said adjacent end of the following rail section.

6. In combination with a tank containing coating material and an overhead rail adapted to have frame equipped trolleys with animal carcasses suspended from the frames travel one at a time along it and provided with a cut-out over the tank dividing it into a preceding and a following rail section, an apparatus adapted to dip the carcasses into the tank for coating purposes and comprising a frame disposed over the tank and in said cut-out, a power driven endless conveyor supported on the frame so that it embodies a substantially horizontal reach extending between and slightly above the opposed ends of the two rail sections, a downwardly extending reach leading toward the tank and an upwardly extending return reach leading to the adjacent end of the following rail section, and consisting of a pair of laterally spaced endless chains and a series of cross-shafts extending between and connected to the chains and having parallel rods pivotally suspended therefrom with hooks on the rods adapted in connection with drive of the conveyor to be brought successively into hooked relation with the frames of the trolleys on the adjacent end of the preceding rail section directly after travel in the horizontal reach and then immediately thereafter to remove said trolleys with their respective carcasses from said adjacent end of the preceding rail section, then during travel in said downwardly extending reach to lower said trolleys towards the tank in order to effect dipping of the carcasses in the material, and then during travel in the upper reach of the conveyor to elevate the trolleys and coated carcasses from the tank and to deposit the trolleys on the adjacent end of the following rail section for travel of said coated carcasses along said latter rail section, and means carried by the apparatus frame and arranged to engage the rods and swing them relatively to the cross shafts in order to effect disengagement of the hooks from the trolley frames after deposit of said trolleys on the adjacent ends of the following rail section.

7. In combination with a tank containing coating material and an overhead rail adapted to have trolleys with animal carcasses swivelly suspended therefrom travel along it and embodying a cut-out over the tank dividing it into sections, an apparatus for dipping the carcasses into the tank for coating purposes, comprising a frame in said cut-out, a power driven conveyor operative in response to drive thereof to remove the carcasses from the adjacent end of one of the sections and to dip them into the material in the tank and finally deliver them onto the adjacent end of the other section, and means adjacent to said adjacent end of said one section for turning the carcasses so that the backs thereof face in a predetermined position immediately prior to removal of the carcasses by the conveyor.

8. In combination with a tank containing coating material and an overhead rail adapted to have trolleys with animal carcasses swivelly suspended therefrom travel along it and embodying a cut-out over the tank dividing it into sections, an apparatus for dipping the carcasses into the tank for coating purposes, comprising a frame in said cut-out, a power driven conveyor operative in response to drive thereof to remove the carcasses from the adjacent end of one of the sections and to dip them into the material in the tank and finally deliver them onto the adjacent end of the other section, and means carried by the frame adjacent said adjacent end of said one section for turning the carcasses so that the backs thereof face in the direction of said other section immediately prior to removal of the carcasses by the conveyor.

9. In combination with a tank containing coating material and an overhead rail adapted to support for travel therealong trolleys with animal carcasses swivelly suspended therefrom by gambrels and embodying a cut-out over the tank for dividing it into sections, an apparatus adapted to dip the carcasses into the tank for coating purposes and comprising a frame disposed in said cut-out, a power driven endless conveyor supported by the frame and operative during drive thereof successively to remove the carcasses from one of the rail sections, then lower them into the material in the tank, and finally elevate them and deliver them to the other section, and means adapted to engage the gambrels during lowering of the carcasses into the material by the conveyor and to coact with said gambrels to prevent turning of the carcasses.

10. In combination with a tank containing coating material and an overhead rail adapted to have trolleys with animal carcasses swivelly suspended therefrom travel along it and embodying a cut-out over the tank dividing it into sections, an apparatus adapted to dip the carcasses into the tank for coating purposes and comprising a frame disposed in said cut-out, a power driven endless conveyor supported by the frame and operative during drive thereof successively to remove the carcasses from one of the rail sections, then lower them into the material in the tank, and finally elevate them and deliver them to the other section, and means carried by the frame for holding the carcasses against turning and with their backs facing towards said other section during lowering of the carcasses into the material by the conveyor.

11. In combination with a tank containing coating material and an overhead rail adapted to support for travel therealong trolleys with animal carcasses swivelly suspended therefrom by gambrels and embodying a cut-out over the tank dividing it into sections, an apparatus for dipping the carcasses into the tank for coating purposes, comprising a frame in said cut-out, a power driven endless conveyor supported by the frame and operative during drive thereof successively to remove the carcasses from one of the rail sections, then lower them into the material in the tank, and finally elevate them and deliver them to the other section, and guide rods carried by the frame adapted slidably to engage the gambrels during lowering of the carcasses into the material by the conveyor and to coact with said gambrels to prevent turning of the carcasses.

12. In combination with a tank containing coating material and an overhead rail adapted to support for travel therealong trolleys with animal carcasses swivelly suspended therefrom by gambrels and embodying a cut-out over the tank dividing it into sections, an apparatus for dipping the carcasses into the tank for coating purposes, comprising a frame in said cut-out, a power driven endless conveyor supported by the frame and operative during drive thereof successively to remove the carcasses from one of the rail sections and lower them into the material in the tank and finally elevate them and deliver them to the other section, means carried by the frame adjacent said one section for turning the carcasses so that the backs thereof face in the direction of said other section immediately prior to removal of the carcasses by the conveyor, and guide bar means mounted on said frame and adapted slidably to engage the gambrels during lowering of the carcasses into the material and to coact therewith so as to hold the carcasses with their backs facing as aforesaid and at the same time prevent turning of the carcasses.

ARTHUR E. OZOUF.